(12) United States Patent
Li

(10) Patent No.: US 9,401,648 B2
(45) Date of Patent: Jul. 26, 2016

(54) CURRENT LIMIT MODULE AND CONTROL MODULE FOR POWER CONVERTERS AND ASSOCIATED METHOD

(71) Applicant: Chengdu Monolithic Power Systems Co., Ltd., Chengdu (CN)

(72) Inventor: Yike Li, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 214 days.

(21) Appl. No.: 14/318,632

(22) Filed: Jun. 28, 2014

(65) Prior Publication Data

US 2015/0003119 A1 Jan. 1, 2015

(30) Foreign Application Priority Data

Jun. 28, 2013 (CN) .......................... 2013 1 0268873

(51) Int. Cl.
  *H02M 1/12*  (2006.01)
  *H02M 3/335*  (2006.01)
  *H02M 1/00*  (2006.01)
  *H02M 1/32*  (2007.01)

(52) U.S. Cl.
  CPC ............ *H02M 3/33507* (2013.01); *H02M 1/32* (2013.01); *H02M 2001/0038* (2013.01)

(58) Field of Classification Search
  CPC ..... H02M 1/32; H02M 3/33507; H02M 1/12; H02M 3/33515; H02M 2001/0038
  See application file for complete search history.

(56) References Cited

U.S. PATENT DOCUMENTS

| | | | | |
|---|---|---|---|---|
| 2004/0257833 A1* | 12/2004 | Yang | ................. | H02M 3/33507 363/16 |
| 2005/0219870 A1* | 10/2005 | Yang | ................. | H02M 3/33507 363/21.01 |
| 2007/0103137 A1* | 5/2007 | Yang | .................... | H02M 3/1563 323/284 |
| 2008/0291701 A1* | 11/2008 | Lin | ........................ | H02M 1/32 363/21.1 |
| 2010/0201335 A1* | 8/2010 | Li | ..................... | H02M 3/33507 323/284 |
| 2012/0275199 A1* | 11/2012 | Li | ..................... | H02M 3/33507 363/21.15 |

* cited by examiner

*Primary Examiner* — Jessica Han
*Assistant Examiner* — Bart Iliya
(74) *Attorney, Agent, or Firm* — Perkins Coie LLP

(57) ABSTRACT

A power converter having a current limit module and a method for controlling the power converter. The power converter converts an input voltage to an output voltage based at least on driving a main switch to switch on and off and regulates the output voltage through regulating a duty cycle of the main switch. The current limit module is configured to compensate a first current limit threshold indicative of a maximum allowable value of a peak value of a switching current of the main switch with a threshold compensation signal indicative of the duty cycle to provide a second current limit threshold. The second current limit threshold is used to limit the maximum value of the peak value, so that a maximum allowable output power of the power converter is substantially uninfluenced by the variation in the duty cycle.

20 Claims, 6 Drawing Sheets

CURRENT LIMIT MODULE AND CONTROL MODULE FOR POWER CONVERTERS AND ASSOCIATED METHOD

CROSS-REFERENCE TO RELATED APPLICATION(S)

This application claims the benefit of CN application No. 201310268873.6 filed on Jun. 28, 2013 and incorporated herein by reference.

TECHNICAL FIELD

This disclosure relates generally to power converters, and more particularly but not exclusively relates to switching power converters, current limit circuit and control circuit for switching power converters and associated control method.

BACKGROUND

Power converters such as switch-mode (switching) power converters are widely used in various electronic devices for sourcing power to the electronic devices from a power source. Taking a flyback type switching regulator for example, the flyback switching regulator is generally applied in applications where the output should be insolated from the input, and the flyback switching regulator can provide one or more isolated output voltages.

A power converter such as a flyback switching regulator usually comprises a control circuit for controlling a switch module to switch on and off so as to convert an input voltage to an output voltage. The switching of the switch module generates a switching current. The percentage of the on time of the switch module in a switching cycle is referred to as a duty cycle. The control circuit can use various control schemes/control modes for controlling the switching regulator. One of the most generally used control modes includes peak current control pulse width modulated mode. In brief, under the peak current control pulse width modulated mode, the control circuit provides a difference signal indicative of a difference between a feedback signal indicative of the output voltage and a reference signal indicative of an desired value of the output voltage, and compares a current sense signal indicative of the switching current with the difference signal to provide a pulse width modulated signal to control the on and off switching of the switch module. For preventing or reducing sub-harmonic vibrations of the switching regulator system, the current sense signal is often compensated with a ramp waveform before being compared with the difference signal.

For the operation safety of the switching regulator, it is also desired to limit the output current or the switching current so that the output current is lower than an allowable threshold of the output current or the switching current is lower than an allowable threshold of the switching current. In practical application, the limitation to the switching current or to the output current can be implemented through limiting the peak value of the switching current to be lower than a predetermined peak current threshold. This is often realized by comparing the ramp compensated current sense signal with the predetermined peak current threshold so as to prevent or reduce the problem of sub-harmonic vibrations.

However, although compensating the current sense signal with the ramp waveform can help to resolve the problem of sub-harmonic vibrations, this may result in decrease in the maximum allowable output power of the switching regulator with the increase of the duty cycle, which is undesirable.

SUMMARY

There has been provided, in accordance with an embodiment of the present disclosure, a current limit module for a power converter, wherein the power converter comprises a main switch and is configured to convert an input voltage to an output voltage based on driving the main switch to switch on and off in response to a pulse width modulated signal, and wherein a switching current flows through the main switch, and wherein the percentage of the on time of the main switch in a switching cycle is referred to as a duty cycle. The current limit module may include a threshold compensation circuit and a current limit comparison circuit. The threshold compensation circuit may have a first compensation input terminal, a second compensation input terminal and a compensation output terminal, wherein the first compensation input terminal is configured to receive a first current limit threshold indicative of a maximum allowable value of a peak value of the switching current, and wherein the second compensation input terminal is configured to receive a threshold compensation signal indicative of the duty cycle, and wherein the threshold compensation circuit is configured to superpose the threshold compensation signal with the first current limit threshold to provide a second current limit threshold at the compensation output terminal. The current limit comparison circuit may have a first comparison input terminal, a second comparison input terminal and a comparison output terminal, wherein the first comparison input terminal is configured to receive a second current sense signal indicative of the switching current with ramp compensation, and wherein the second comparison input terminal is configured to receive the second current limit threshold, and wherein the current limit comparison circuit is configured to compare the second current sense signal with the second current limit threshold to generate a second comparison signal at the comparison output terminal, and wherein the second comparison signal triggers the pulse width modulated signal to turn the main switch off when the second current sense signal exceeds the second current limit threshold.

There has also been provided, in accordance with an embodiment of the present disclosure, a control module comprising the current limit module. The control module may further comprise: a current sense module electrically coupled to the main switch to sense the switching current and to provide a first current sense signal indicative of the switching current; a ramp compensation module configured to receive the first current sense signal and a ramp compensation signal having a predetermined slope, and further configured to add the first current sense signal with the ramp compensation signal to provide the second current sense signal; a pulse width modulation module configured to receive a feedback signal indicative of the output voltage, a reference signal indicative of a desired value of the output voltage and the second current sense signal, and further configured to provide a difference signal indicative of a difference between the feedback signal and the reference signal, and further configured to compare the second current sense signal with the difference signal to provide a first comparison signal; a logic operational module configured to receive the first comparison signal and the second comparison signal respectively, and further configured to provide an off trigger signal based on operating the first comparison signal and the second comparison signal, wherein the off trigger signal comprises the first comparison signal when the second current sense signal is lower than the second current limit threshold, and wherein the off trigger signal comprises the second comparison signal when the second current sense signal is higher than the second current limit threshold; and a logic control module configured to receive the off trigger signal and a clock signal respectively, and further configured to provide the pulse width modulated signal based on the off trigger signal and the clock signal, wherein the clock signal triggers the logic control module to set the pulse width modulated signal at a first logic state, and wherein the off trigger signal triggers the logic control module to set the pulse width modulated signal at a second logic state; and wherein the pulse width modulated signal is configured to turn the main on at the first logic state and to turn the main switch off at the second logic state.

There has also been provided, in accordance with an embodiment of the present disclosure, a power converter comprising: an input port configured to receive an input voltage; an output port configured to provide an output voltage; a switching module comprising at least a main switch configured to conduct on and off switching in response to a pulse width modulated signal so as to convert the input voltage into the output voltage, wherein a switching current flows through the main switch, and wherein the percentage of the on time of the main switch in a switching cycle is referred to as a duty cycle; and a control module having a first input terminal configured to receive a feedback signal indicative of the output voltage, a second input terminal configured to receive a reference signal indicative of an desired value of the output voltage, a third input terminal configured to receive a first current sense signal indicative of the switching current, a fourth input terminal configured to receive a first current limit threshold indicative of a maximum allowable value of a peak value of the switching current, and a control output terminal configured to provide the pulse width modulated signal, wherein the control module is configured to compensate the first current sense signal with a ramp compensation signal to generate a second current sense signal, and is further configured to superpose a threshold compensation signal indicative of the duty cycle with the first current limit threshold to provide a second current limit threshold, and is further configured to compare the second current sense signal with the second current limit threshold to provide a second comparison signal, and wherein the second comparison signal triggers the pulse width modulated signal to turn the main switch off when the second current sense signal exceeds the second current limit threshold.

There has also been provided, in accordance with an embodiment of the present disclosure, a method for controlling a power converter, wherein the power converter comprises a main switch and is configured to convert an input voltage to an output voltage based on driving the main switch to switch on and off, and wherein a switching current flows through the main switch, and wherein the percentage of the on time of the main switch in a switching cycle is referred to as a duty cycle. The method may comprise: sensing the output voltage to provide a feedback signal indicative of the output voltage; sensing the switching current to provide a first current sense signal indicative of the switching current; compensating the first current sense signal with a ramp compensation signal to provide a second current sense signal; generating a difference signal indicative of a difference between the feedback signal and a reference signal, wherein the reference signal is indicative of a desired value of the output voltage; comparing the second current sense signal with the difference signal to output a first comparison signal; providing a first current limit threshold indicative of a maximum allowable value of a peak value of the switching current, and superposing a threshold compensation signal indicative of the duty cycle to the first current limit threshold to provide a second current limit threshold; comparing the second current sense signal with the second current limit threshold to generate a second comparison signal; turning the main switch off in response to the second comparison signal when the second current sense signal is larger than the second current limit threshold, and turning the main switch off in response to the first comparison signal when the second current sense signal is smaller than the second current limit threshold and larger than the difference signal; and turning the main switch on in response to a clock signal.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

The use of the same reference label in different drawings indicates the same or like components or structures with substantially the same functions for the sake of simplicity.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
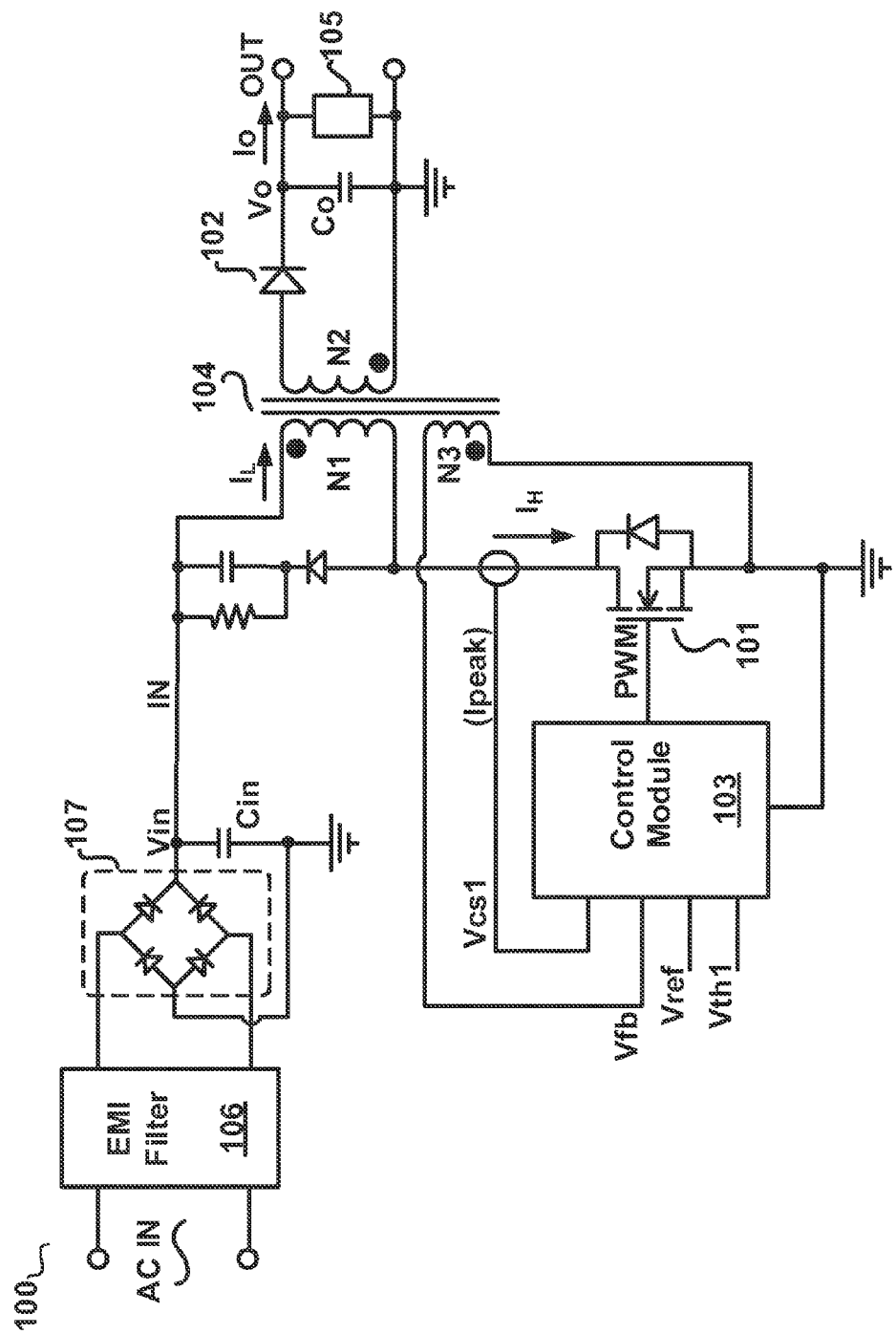
FIG. 1 illustrates a block diagram of a typical buck type DC-DC voltage converter 50.

FIG. 1 illustrates a schematic diagram of a power converter 100 in accordance with an exemplary embodiment of the present invention. The power converter 100 may comprise an input port IN configured to receive an input voltage Vin; an output port OUT configured to provide an output voltage Vo and an output current Io for supplying a load 105. The power converter 100 further comprises a switch module illustrated as to at least comprise a main switch, e.g. a high side switch 101 in FIG. 1. The switch module is configured to conduct on and off switching in response to a pulse width modulated signal PWM so as to convert the input voltage Vin into the output voltage Vo. The power converter 100 further comprises a control module 103 having a first input terminal configured to receive a feedback signal Vfb indicative of the output voltage Vo, a second input terminal configured to receive a reference signal Vref indicative of an desired value of the output voltage Vo, a third input terminal configured to receive a first current sense signal Vcs1 indicative of the output current Io, a fourth input terminal configured to receive a first current limit threshold Vth1 indicative of a maximum allowable value of the output current Io, and a control output terminal configured to provide the pulse width modulated signal based at least on the feedback signal Vfb, the reference signal Vref, the first current sense signal Vcs1 and the first current limit threshold Vth1.

In accordance with an exemplary embodiment of the present invention, the switch module 101 of the power converter 100 may further comprise a second switch, e.g. a synchronous switch 102. In the example of FIG. 1, the main switch 101 is illustrated to comprise a controllable switch element, e.g. a MOSFET, the second switch 102 is illustrated to comprise a diode. The second switch 102 is configured to switch on or off in complementarily with the main switch 101, i.e. when the main switch 101 is switched on, the second switch 102 is switched off, and vice versa.

In accordance with an exemplary embodiment of the present invention, the power converter 100 may further comprise an inductive power storage device 104, which is electrically coupled to the input port IN when the main switch 101 is switched on to store energy, and is electrically coupled to the output port OUT when the main switch 101 is switched off to provide energy to the load 105. In the example of FIG. 1, the inductive power storage device 104 is illustrated to comprise a transformer, having a first winding N1 and a second winding N2, wherein the first winding N1 is coupled to the main switch 101 and the input port IN, and functions as a primary winding, and wherein the second winding is coupled to the load 105 through the second switch 102, and functions as a secondary winding. The power converter 100 may further comprise a capacitive output filtering device Co, which is electrically coupled to the output port OUT, and is configured to filter the output of the switch module so that the output voltage Vo at the output port OUT is smoothed. In the present exemplary embodiment of FIG. 1, the power converter 100 is configured to have a flyback type topology and may be referred to as a flyback power converter. The unregulated DC voltage Vin provided at the input port IN may be obtained by processing an AC supply voltage with an EMI filter 106 and a bridge 107 for example.

In accordance with an exemplary embodiment of the present invention, the inductive power storage device 104 may further include a third winding N3, as an auxiliary winding, to sense the output voltage Vo and provide the feedback signal Vfb. In other embodiments, the third winding N3 may not be necessary, and the feedback signal Vfb may be provided by an optical coupler.

In accordance with an exemplary embodiment of the present invention, the control module 103 is configured to control the on and off switching of the switch module with peak current control pulse width modulation mode. In an embodiment, the control module 103 at least provides the pulse width modulated signal PWM to the main switch 101 of the switch module, to control the on and off switching of the main switch 101. In this disclosure, the percentage of the on time of the main switch 101 in a switching cycle of the switches 101 and 102 is referred to as a duty cycle D of the power converter 100. The control module 103 regulates the output voltage Vo through regulating the duty cycle D. In peak current control pulse width modulation mode, the first current sense signal Vcs1 can be obtained through monitoring the switching current $I_H$ flowing through the main switch 101 or through monitoring the inductor current $I_L$ flowing through the inductive power storage device 104 (e.g. the current flowing through the primary winding N1). Therefore, the first current sense signal Vcs1 is proportional to the switching current $I_H$ or the inductor current and carries the peak value Ipeak information of the switching current $I_H$ or the inductor current $I_L$. In correspondence, the first current limit threshold Vth1 may be a threshold indicative of the peak value Ipeak of the switching current $I_H$ or the inductor current $I_L$. Since the output current Io can be considered as an average of the switching current $I_H$ or the inductor current $I_L$, the first current limit threshold actually also indicates the maximum value of the output current Io.

Figure 2:
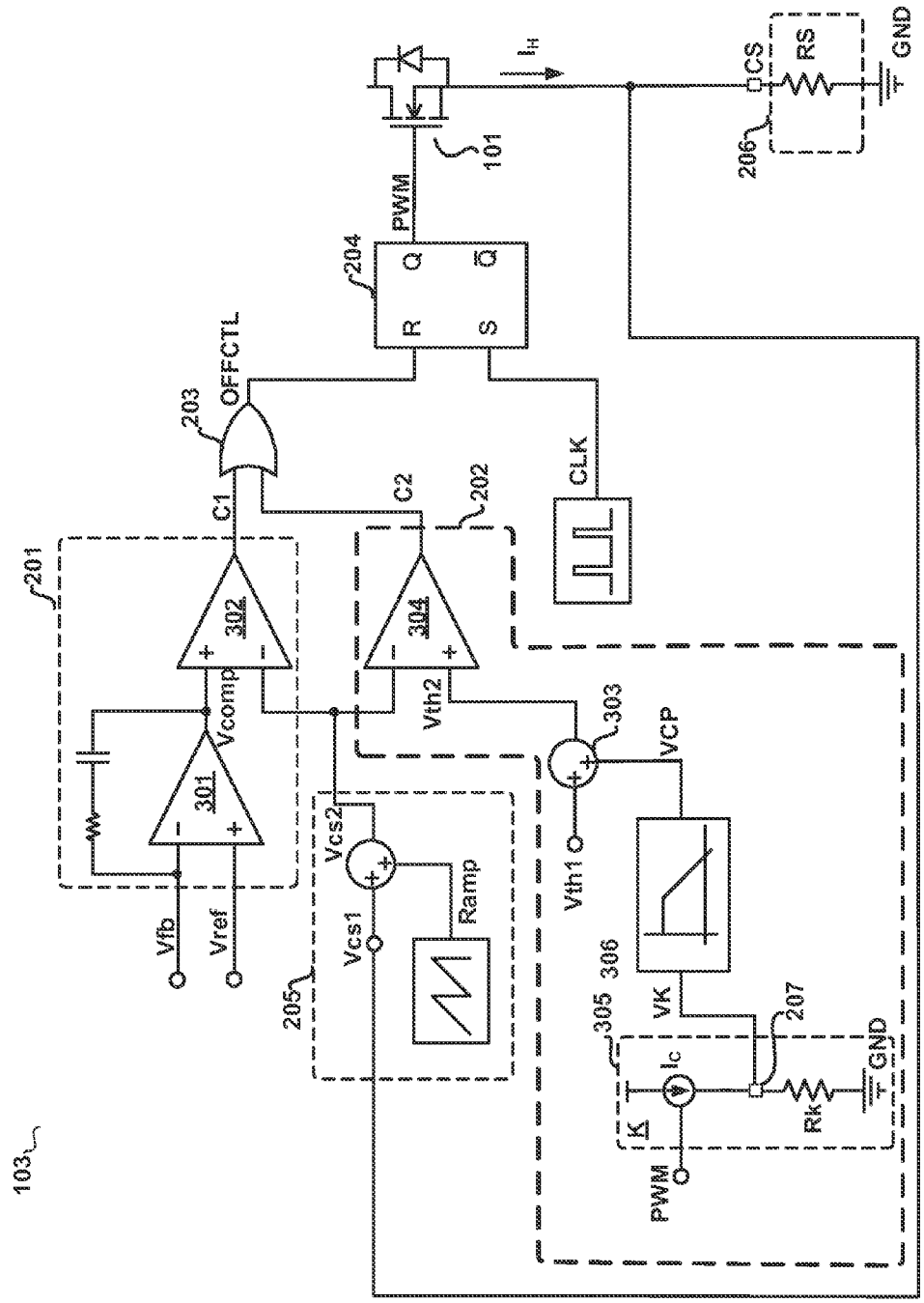
FIG. 2 illustrates a schematic diagram of a power converter 100 in accordance with an exemplary embodiment of the present invention.

FIG. 2 illustrates a schematic diagram of a control module 103 that can be used in the power converter 100 in accordance with an exemplary embodiment of the present invention. In the following, the power converter 100 and the control module 103 will be described in detail in conjunction with FIGS. 1 and 2.

In accordance with an embodiment of the present invention, the control module 103 operating in peak current control pulse width modulation mode is configured to process the feedback signal Vfb and the reference signal Vref to provide a difference signal Vcomp indicative of the difference between the feedback signal Vfb and the reference signal Vref, to compensate the first current sense signal Vcs1 with a ramp compensation signal Ramp to provide a second current sense signal Vcs2, and to compare the second current sense signal Vcs2 with the difference signal Vcomp to output a first comparison signal C1. The control module 103 is further configured to superpose a threshold compensation signal VCP indicative of the duty cycle D to the first current limit threshold Vth1 to provide a second current limit threshold Vth2, and to compare the second current sense signal Vcs2 with the second current limit threshold Vth2 to output a second comparison signal C2, wherein the second current limit threshold Vth2 varies in the same direction with the duty cycle D, i.e. the second current limit threshold Vth2 increases when the duty cycle D increases and decreases when the duty cycle D decreases. The control module 103 is further configured to process the first comparison signal C1 and the second comparison signal C2 to generate an off trigger signal OFFCTL, wherein the first comparison signal C1 is output as the off trigger signal OFFCTL when the second current sense signal Vcs2 is lower than the second current limit threshold Vth2, and wherein the second comparison signal C2 is output as the off trigger signal OFFCTL when the second current sense signal Vcs2 is higher than the second current limit threshold Vth2. The control module 103 is further configured to generate the pulse width modulated signal PWM based on the off trigger signal OFFCTL and a clock signal CLK, wherein the pulse width modulated signal PWM controls the main switch 101 to switch on in response to the clock signal CLK, and controls the main switch 101 to switch off in response to the off trigger signal OFFCTL. In accordance with an exemplary embodiment, during each switching cycle, the clock signal CLK determines the start of a pulse of the pulse width modulated signal PWM, and the off trigger signal determines the end of a pulse of the pulse width modulated signal PWM. The main switch 101 is kept on within the pulse of the pulse width modulated signal PWM, and is kept off outside the pulse of the pulse width modulated signal PWM in each switching cycle. Therefore, the pulse width modulated signal PWM regulates the duty cycle D through controlling the on and off switch of the main switch 101, and thus carries the duty cycle D information.

In accordance with an embodiment of the present invention, the threshold compensation signal VCP varies in the same direction as the duty cycle D, i.e. the threshold compensation signal VCP increases with the increase of the duty cycle D and decreases with the decrease of the duty cycle D. In this case, the superposing of the threshold compensation signal VCP to the first current limit threshold Vth1 refers to adding the threshold compensation signal VCP to the first current limit threshold Vth1.

In accordance with an embodiment of the present invention, the threshold compensation signal VCP varies in a reverse direction from the duty cycle D, i.e. the threshold compensation signal VCP increases with the decrease of the duty cycle D and decreases with the increase of the duty cycle D. In this case, the superposing of the threshold compensation signal VCP to the first current limit threshold Vth1 refers to subtracting the threshold compensation signal VCP from the first current limit threshold Vth1.

According to the various embodiments described above, since the second current sense signal Vcs2 is generated by compensating the first current sense signal Vcs1 with a ramp compensation signal Ramp. Thus the second current sense signal Vcs2 also carries the peak value Ipeak information of the switching current $I_H$ or the inductor current $I_L$. The control module 103 limits the peak value Ipeak through comparing the second current sense signal Vcs2 with the second current limit threshold Vth2. If the second current sense signal Vcs2 exceeds the second current limit threshold Vth2, it indicates that the switching current $I_H$ or the inductor current $I_L$ is too large and may cause damage to the power converter 100 and/or the load 105. In this circumstance, the control module 103 needs to operate in current limit mode, wherein the second comparison signal C2 is output as the off trigger signal OFFCTL. The pulse width modulated signal PWM controls the main switch 101 to turn off in response to the second comparison signal C2 (i.e. the off trigger signal OFFCTL under current limit mode). The second comparison signal C2 may be a pulse signal for example, wherein when the second current sense signal Vcs2 exceeds the second current limit threshold Vth2, a pulse is generated in the second comparison signal C2 and is used to trigger the pulse width modulated signal PWM to turn the main switch 101 off. The second current limit threshold Vth2 is actually indicative of a maximum value that the peak value Ipeak of the switching current $I_H$ or the inductor current $I_L$ can reach. If the second current sense signal Vcs2 is lower than the second current limit threshold Vth2, it indicates that the switching current $I_H$ or the inductor current $I_L$ is within a normal safe range, and the power converter 100 and the load 105 can operate safely. In this circumstance, the control module 103 operates in normal peak current control mode and the first comparison signal C1 is output as the off trigger signal OFFCTL. The pulse width modulated signal PWM controls the main switch 101 to turn off in response to the first comparison signal C1 (i.e. the off trigger signal OFFCTL under peak current control mode). The first comparison signal C1 may also be a pulse signal for example, wherein when the second current sense signal Vcs2 exceeds the difference signal Vcomp, a pulse is generated in the first comparison signal C1 and is used to trigger the pulse width modulated signal PWM to turn the main switch 101 off. The difference signal Vcomp can be considered as indicative of a reference value that the peak value Ipeak of the switching current $I_H$ or the inductor current $I_L$ is expected to reach. Since the second current limit threshold Vth2 varies in the same direction with the duty cycle D, the maximum value that the peak value Ipeak of the switching current $I_H$ or the inductor current $I_L$ is allowed to reach, which is limited by the second current limit threshold Vth2, also varies in the same direction with the duty cycle D. That is to say, the allowable maximum value of the peak value Ipeak, increases with the increase of the duty cycle D and decreases with the decrease of the duty cycle D. In this way, the allowable maximum value of the output current Io increases with the increase of the duty cycle D. This may help to substantially cancel or at least remedy the decrease in the allowable maximum output power with the increase in the duty cycle D of the power converter 100 which is caused by compensating the first current limit signal Vcs1 by the ramp signal Ramp. That is to say, through reasonably setting the relationship between the threshold compensation signal VCP and the duty cycle D, the variation in the second current sense signal Vcs2 with the duty cycle D can be substantially cancelled or at least remedied by the variation in the second current limit threshold Vth2 with the duty cycle D. Thus, since the control module 103 compares the second current sense signal Vcs2 with the second current limit threshold Vth2 to limit the maximum value of the peak current Ipeak of the switching current $I_H$ or the inductor current $I_L$, the maximum value of the peak current Ipeak may actually remain substantially constant and do not vary with the duty cycle D. In consequence, the control module 103 which is configured to compensate the first current sense signal Vcs1 with the ramp signal Ramp can advantageously solve the problem of sub-harmonic vibration when the duty cycle D exceeds 50%. The control module 103 which is further configured to compensate the first current limit threshold Vth1 with the threshold compensation signal VCP that varies in the same direction with the duty cycle D can further advantageously make the maximum allowable value of output current Io remain substantially constant (i.e. do no vary with the duty cycle D). Therefore, the maximum allowable output power of the power converter is substantially uninfluenced by the variation in the duty cycle D.

In accordance with the exemplary embodiment of FIG. 2, the control module 103 may comprise a pulse width modulation ("PWM") module 201, a current limit module 202, a logic operational module 203, and a logic control module 204. The PWM module 201 is configured to receive the feedback signal Vfb, the reference signal Vref and the second current sense signal Vcs2, and is configured to calculate the difference between the feedback signal Vfb and the reference signal Vref to provide the difference signal Vcomp, and is further configured to compare the second current sense signal Vcs2 with the difference signal Vcomp to provide the first comparison signal C1. In the example of FIG. 2, the PWM module 201 is illustrated as to comprise an operational amplifier 301 and a first comparator 302. The operational amplifier 301 has a first input terminal (e.g. the "−" input terminal in FIG. 2) configured to receive the feedback signal Vfb, a second input terminal (e.g. the "+" input terminal in FIG. 2) configured to receive the reference signal Vref, and an output terminal configured to provide the difference signal Vcomp. A compensation circuit, illustrated in FIG. 2 as to comprise a resistor and a capacitor in series, is usually coupled between the first input terminal and the output terminal of the operational amplifier 301 to improve control loop stability. The first comparator 302 has a first input terminal (e.g. the "−" input terminal in FIG. 2) configured to receive the second current sense signal Vcs2, a second input terminal (e.g. the "+" input terminal in FIG. 2) configured to receive the difference signal Vcomp, and an output terminal configured to provide the first comparison signal C1.

The current limit module 202 is configured to receive the first current limit threshold Vth1, the threshold compensation signal VCP and the second current sense signal Vcs2, and is configured to superpose the first current limit threshold Vth1 with the threshold compensation signal VCP to provide the second current limit threshold Vth2, and is further configured to compare the second current sense signal Vcs2 with the second current limit threshold Vth2 to provide the second comparison signal C2. In the example of FIG. 2, the current limit module 202 is illustrated as to comprise a threshold compensation circuit 303 and a current limit comparison circuit 304. The threshold compensation circuit 303 is configured to receive the first current limit threshold Vth1 and the threshold compensation signal VCP respectively at a first input terminal and a second input terminal, and is configured to superpose the first current limit threshold Vth1 with the threshold compensation signal VCP to provide the second current limit threshold Vth2 at an output terminal. The current limit comparison circuit 304 is configured to receive the second current sense signal Vcs2 and the second current limit threshold Vth2 respectively at a first comparison input terminal (e.g. the "−" input terminal of 304 in FIG. 2) and a second comparison input terminal (e.g. the "+" input terminal of 304 in FIG. 2), and is configured to compare the second current sense signal Vcs2 with the second current limit threshold Vth2 to provide the second comparison signal C2 at a comparison output terminal. In an embodiment, when the second current sense signal Vcs2 exceeds the second current limit threshold Vth2, the second comparison signal C2 generates a narrow pulse and triggers the pulse width modulated signal PWM to turn the main switch 101 off; when the second current sense signal Vcs2 is lower than the second current limit threshold Vth2, the second comparison signal C2 remains at a low logic level and does not triggers the pulse width modulated signal PWM.

In accordance with an exemplary embodiment of the present invention, still referring to FIG. 2, the current limit module 202 may further comprise: a compensation signal generator which is configured to generate the threshold compensation signal VCP. In an exemplary embodiment, the compensation signal generator may comprise a compensation coefficient regulator 305 and a filter 306. The compensation coefficient regulator 305 is configured to receive the pulse width modulated signal PWM which carries the duty cycle D information, and is configured to apply a compensation coefficient K in response to the pulse width modulated signal PWM to provide a coefficient regulation signal VK, wherein the coefficient regulation signal VK carries the information of the compensation coefficient K and the duty cycle D. The filter 306 is configured to receive the coefficient regulation signal VK, and to filter the coefficient regulation signal VK to provide the average of the coefficient regulation signal VK as the threshold compensation signal VCP. Therefore, the threshold compensation signal VCP is proportional to the compensation coefficient K.

The logic operational module 203 is configured to receive the first comparison signal C1 and the second comparison signal C2 respectively at a first input terminal and a second input terminal of the logic operational module 203, and is configured to provide an off trigger signal OFFCTL, wherein the off trigger signal OFFCTL comprises the first comparison signal C1 when the second current sense signal Vcs2 is lower than the second current limit threshold Vth2, and comprises the second comparison signal C2 when the second current sense signal Vcs2 is higher than the second current limit threshold Vth2. In the example of FIG. 2, the logic operational module 203 is illustrated as to comprise an "OR" logic circuit, however this is not intended to be limiting. In other embodiments, the logic operational module 203 may comprise other logic circuits.

The logic control module 204 is configured to receive the off trigger signal OFFCTL and the clock signal CLK, and to provide the pulse width modulated signal PWM based on the off trigger signal OFFCTL and the clock signal CLK, wherein the clock signal CLK triggers the logic control module 204 to set the pulse width modulated signal PWM at a first logic state (e.g. logic high), and the off trigger signal OFFCTL triggers the logic control module 204 to set the pulse width modulated signal PWM at a second logic state (e.g. logic low). In an embodiment, the pulse width modulated signal PWM controls the main switch 101 to turn on at its first logic state and controls the main switch 101 to turn off at its second logic state.

In accordance with an exemplary embodiment of the present invention, the control module 103 may further comprise a ramp compensation module 205. The ramp compensation module 205 is configured to receive the first current sense signal Vcs1 and the ramp compensation signal RampRamp having a predetermined slope, and to add the first current sense signal Vcs1 with the ramp compensation signal Ramp to provide the second current sense signal Vcs2. The ramp compensation signal Ramp has a frequency substantially consists with that of the clock signal CLK.

In accordance with an exemplary embodiment of the present invention, the control module 103 may further comprise a current sense module 206. The current sense module 206 is electrically coupled to the main switch 101 to sense the current $I_H$ flowing through the main switch 101 so as to provide the first current sense signal Vcs1 indicative of the switching current $I_H$.

In accordance with an exemplary embodiment of the present invention, the power converter 100 has a current sense pin CS. For example, in FIG. 2, the main switch 101 is electrically coupled to the current sense pin CS. The current sense module 206 is illustrated as to comprise a current sense resistor RS, coupled between the current sense pin CS and the reference ground GND. In other embodiment, the current sense module 206 can comprise other current sense circuit.

In accordance with an exemplary embodiment of the present invention, the power converter 100 further has an independent current limit threshold regulation pin 207, referring to FIG. 2. In this circumstance, the compensation coefficient regulator 305 may have various configurations. In the example of FIG. 2, the compensation coefficient regulator 305 comprises: a controllable current source $I_C$ and a coefficient regulation resistor Rk. The controllable current source $I_C$ has a control terminal and an output terminal, wherein the control terminal is configured to receive the pulse width modulated signal PWM, the output terminal is electrically coupled to the current limit threshold regulation pin 207 and is configured to output a substantially constant current in response to the pulse width modulated signal PWM during when the main switch 101 is on, and is configured to cut the constant current off in response to the pulse width modulated signal PWM during when the main switch 101 is off. The coefficient regulation resistor Rk is coupled between the current limit threshold regulation pin 207 and the reference ground GND. The coefficient regulation signal VK is provided at the current limit threshold regulation pin 207.

In the compensation coefficient regulator 305 of FIG. 2, the controllable current source $I_C$ actually provides a square wave current signal having a phase the same as that of the pulse width modulated signal PWM to the current limit threshold regulation pin 207, i.e. the square wave current signal has a pulse width the same as that of the pulse width modulated signal PWM and a pulse amplitude equal to the constant current. Thus, the pulse width of the square wave current signal is indicative of the duty cycle D, the pulse amplitude of the square wave current signal can be regulated through setting the constant current of the controllable current source $I_C$. The square wave current signal is provided to the coefficient regulation resistor Rk via the current limit threshold regulation pin 207, and then converted to a square wave voltage signal, i.e. the coefficient regulation signal VK. Therefore, the coefficient regulation signal VK provided by the compensation coefficient regulator 305 of FIG. 2 virtually carries the information of the duty cycle D, the constant current and the coefficient regulation resistor Rk, and is substantially proportional to the duty cycle D and the coefficient regulation resistor Rk. In consequence, the coefficient regulation signal VK may be expressed by $VK \approx K*D$, wherein the coefficient K can be considered as the compensation coefficient. The compensation coefficient K can be modified through appropriately choosing the constant current and the coefficient regulation resistor Rk. Generally, the constant current is provided by an internal circuit inside the chip of the power converter 100. The coefficient regulation resistor Rk is provided by user to the current limit threshold regulation pin 207 and is thus user programmable. The compensation coefficient K can thus be easily modified by user through modifying the coefficient regulation resistor Rk. The coefficient regulation signal VK is subsequently provided to the filter 306 and is filtered to generate the threshold compensation signal VCP. The threshold compensation signal VCP is proportional to the compensation coefficient K. In this example, the threshold compensation signal VCP varies in the same direction as the duty cycle D (i.e. the threshold compensation signal VCP increases with the increase of the duty cycle D and decreases with the decrease of the duty cycle D). Therefore, the threshold compensation circuit 303 is configured to add the threshold compensation signal VCP to the first current limit threshold Vth1 to generate the second current limit threshold Vth2 so that the second current limit threshold Vth2 varies in the same direction as the duty cycle D. In consequence, the allowable maximum value of the peak value Ipeak of the switching current $I_H$ or the inductor current $I_L$ also varies in the same direction as the duty cycle D, which means that the allowable maximum value of the output current Io increases with the increase of the duty cycle D. This may help to substantially cancel or at least remedy the decrease in the allowable maximum output power with the increase in the duty cycle D of the power converter 100 which is caused by compensating the first current limit signal Vcs1 by the ramp signal Ramp.

Figure 3:
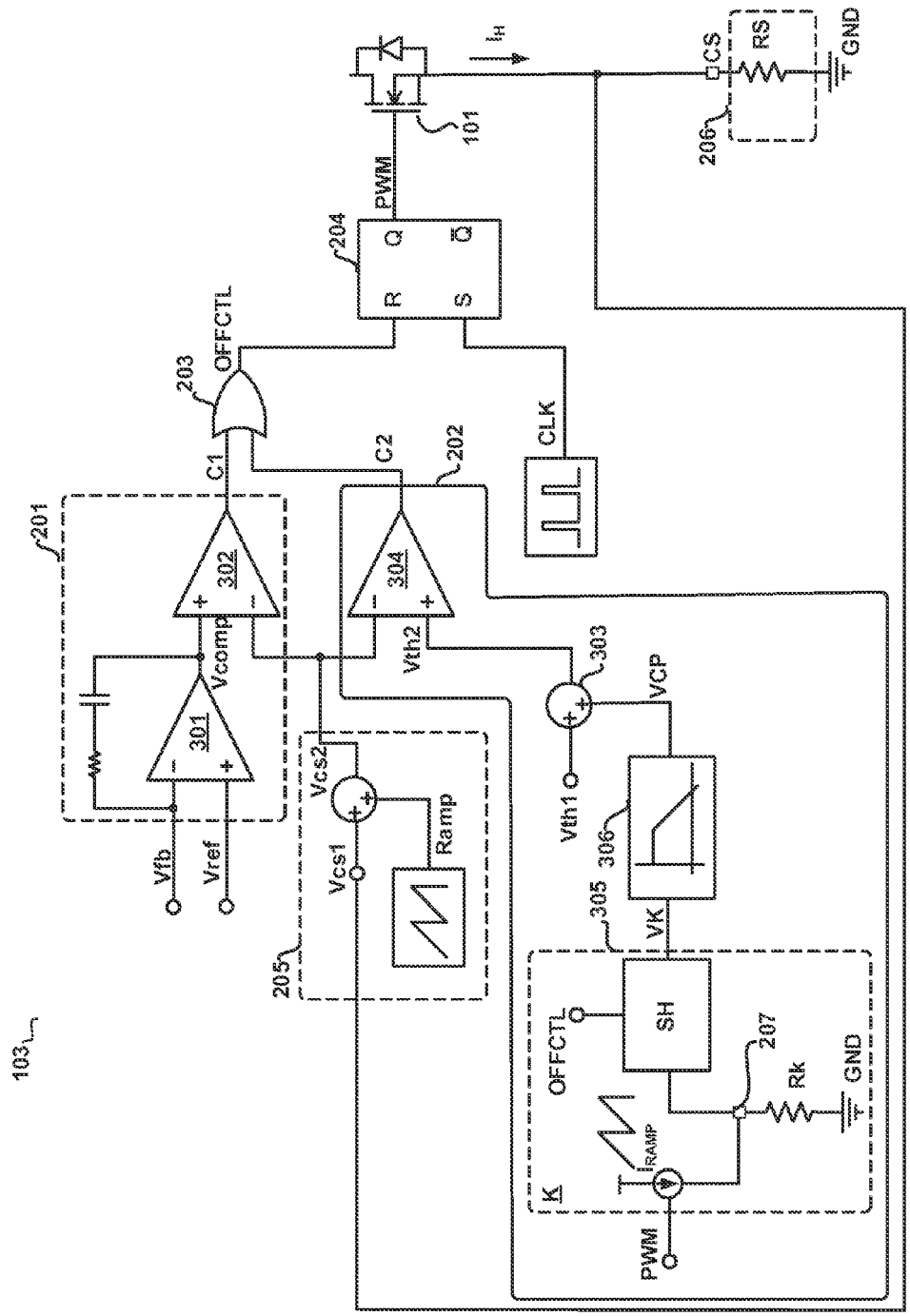
FIG. 3 illustrates a schematic diagram of a power converter 200 in accordance with an alternative exemplary embodiment of the present invention.

FIG. 3 illustrates a schematic diagram of a control module 103 that can be used in the power converter 100 in accordance with an alternative embodiment of the present invention. Components or structures in the control circuit shown in FIG. 3 with substantially the same functions as those of the control circuit shown in FIG. 2 are identified by the same reference labels for the sake of simplicity. According to the example of FIG. 3, the power converter 100 still has an independent current limit threshold regulation pin 207. In comparison with FIG. 2, FIG. 3 illustrates an alternative implementation configuration of the compensation coefficient regulator 305 comprising a controllable current source $I_{RAMP}$, a coefficient regulation resistor Rk and a sample-hold circuit SH. The controllable current source $I_{RAMP}$ has a control terminal and an output terminal, wherein the control terminal is configured to receive the pulse width modulated signal PWM, the output terminal is electrically coupled to the current limit threshold regulation pin 207 and is configured to output a ramp current with a predetermined slope in response to the pulse width modulated signal PWM during when the main switch 101 is on, and is configured to cut the ramp current off in response to the pulse width modulated signal PWM during when the main switch 101 is off. The coefficient regulation resistor Rk is coupled between the current limit threshold regulation pin 207 and the reference ground GND and is user programmable. The sample-hold circuit SH has a sample control terminal, a sample input terminal and a sample output terminal, wherein the sample control terminal is configured to receive the off trigger signal OFFCTL, the sample input terminal is electrically coupled to the current limit threshold regulation pin 207, the sample-hold circuit SH is configured to sample the voltage at current limit threshold regulation pin 207 at the moment when the main switch 101 is turned off in response to the off trigger signal OFFCTL, and is further configured to hold the sampled voltage and provide that held sampled voltage at the sample output terminal as the coefficient regulation signal VK.

In the compensation coefficient regulator 305 of FIG. 3, during the main switch 101 is on, the controllable current source $I_{RAMP}$ actually provides the ramp current to the current limit threshold regulation pin 207, and the ramp current is converted to a ramp voltage at the current limit threshold regulation pin 207 by the coefficient regulation resistor Rk. Thus the voltage at the current limit threshold regulation pin 207 is a ramp voltage with the predetermined slope. At the moment when the main switch 101 is turned off in response to the off trigger signal OFFCTL, the ramp current is cut off and the voltage at the current limit threshold regulation pin 207 stops rising. At the same time, the sample-hold circuit SH samples the voltage at the current limit threshold regulation pin 207 of that moment. This sampled voltage actually represents the on time interval of the main switch 101, thus indicates the duty cycle D. The sample-hold circuit SH holds this sampled voltage indicative of the duty cycle D and outputs it as the coefficient regulation signal VK. Therefore, the coefficient regulation signal VK provided by the compensation coefficient regulator 305 of FIG. 3 virtually carries the information of the duty cycle D, the slope of the ramp current and the coefficient regulation resistor Rk, and is substantially proportional to the duty cycle D and the coefficient regulation resistor Rk. In consequence, the coefficient regulation signal VK may be expressed by $VK \approx K*D$, wherein the coefficient K can be considered as the compensation coefficient. The compensation coefficient K can be modified through appropriately choosing the slope of the ramp current and the coefficient regulation resistor Rk. User can easily modify the compensation coefficient K by modifying the coefficient regulation resistor Rk. The coefficient regulation signal VK is subsequently provided to the filter 306 and is filtered to generate the threshold compensation signal VCP. The threshold compensation signal VCP is proportional to the compensation coefficient K. In this example, the threshold compensation signal VCP varies in the same direction as the duty cycle D (i.e. the threshold compensation signal VCP increases with the increase of the duty cycle D and decreases with the decrease of the duty cycle D). Therefore, the threshold compensation circuit 303 is configured to add the threshold compensation signal VCP to the first current limit threshold Vth1 to generate the second current limit threshold Vth2 so that the second current limit threshold Vth2 varies in the same direction as the duty cycle D. In consequence, the allowable maximum value of the peak value Ipeak of the switching current $I_H$ or the inductor current $I_L$ also varies in the same direction as the duty cycle D, which means that the allowable maximum value of the output current Io increases with the increase of the duty cycle D. This may help to substantially cancel or at least remedy the decrease in the allowable maximum output power with the increase in the duty cycle D of the power converter 100 which is caused by compensating the first current limit signal Vcs1 by the ramp signal Ramp.

In accordance with an exemplary embodiment of the present invention, the power converter 100 may not have an independent current limit threshold regulation pin, but uses the current sense pin CS as the current limit threshold regulation pin. Therefore, the power converter 100 in this circumstance has a pin saved.

Figure 4:
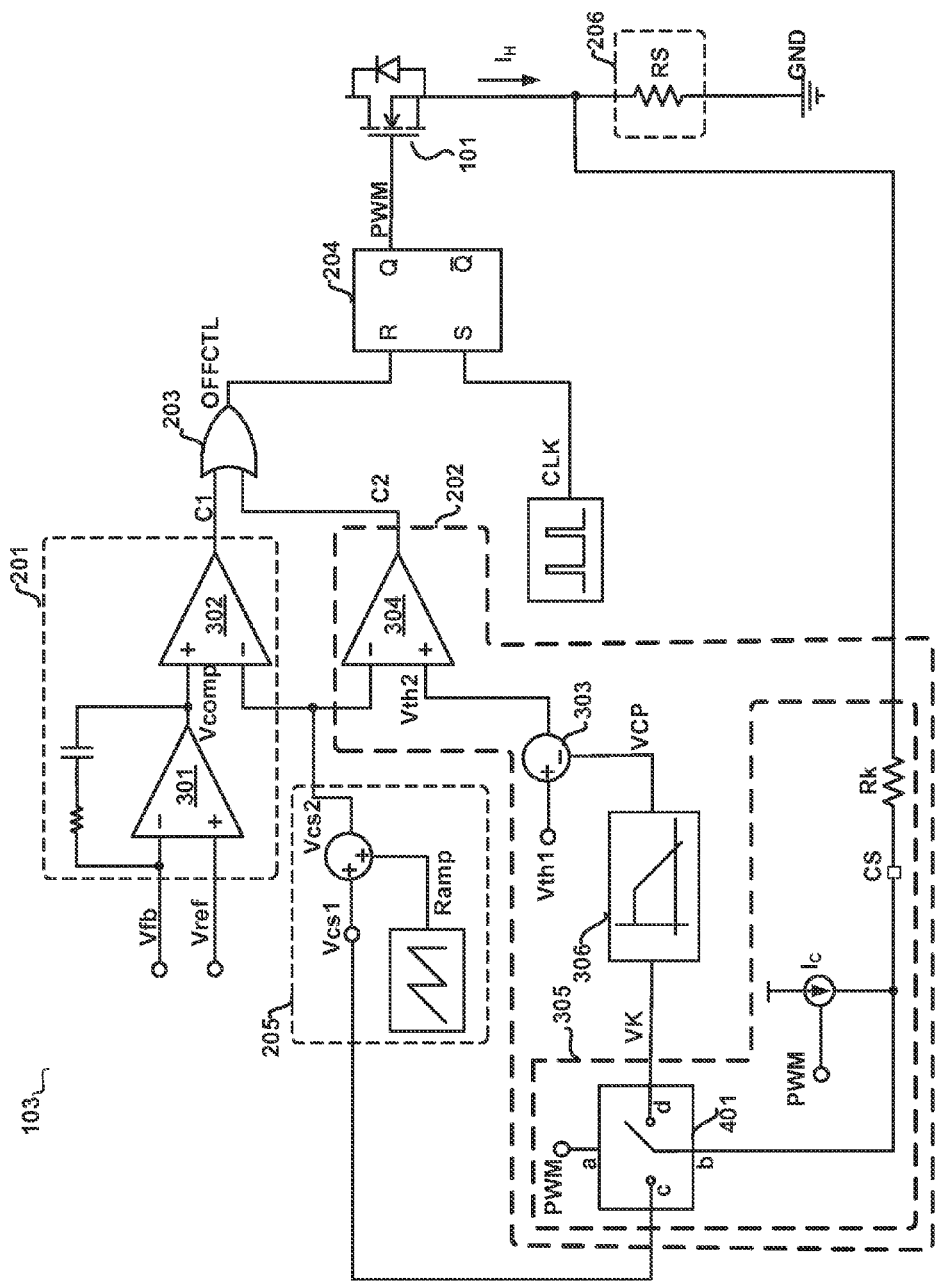
FIG. 4 illustrates a schematic diagram of a frequency control circuit 204 in accordance with an exemplary embodiment of the present invention.

FIG. 4 illustrates a schematic diagram of a control module 103 that can be used in the power converter 100 in accordance with an alternative embodiment of the present invention. Components or structures in the control circuit shown in FIG. 4 with substantially the same functions as those of the control circuits shown in FIG. 2 and FIG. 3 are identified by the same reference labels for the sake of simplicity. The control module 103 of FIG. 4 can be used in the power converter 100 when the current sense pin CS is used in the meanwhile as the current limit threshold regulation pin. In comparison with FIG. 2 and FIG. 3, FIG. 4 illustrates another alternative implementation configuration of the compensation coefficient regulator 305. In this example, the compensation coefficient regulator 305 may comprise a controllable current source $I_C$, a coefficient regulation resistor Rk and a pass device 401. The controllable current source $I_C$ has a control terminal and an output terminal, wherein the control terminal is configured to receive the pulse width modulated signal PWM, the output terminal is electrically coupled to the current sense pin CS and is configured to output a substantially constant current in response to the pulse width modulated signal PWM during when the main switch 101 is off, and is configured to cut the constant current off in response to the pulse width modulated signal PWM during when the main switch 101 is on. The coefficient regulation resistor Rk is coupled between the current sense pin CS and the sense resistor RS. In FIG. 4, the current sense resistor RS and the coefficient regulation resistor Rk can be provided by user and are thus user programmable. The pass device 401 has a pass control terminal a, a pass input terminal b, a first pass output terminal c and a second pass output terminal d, wherein the pass control terminal a is configured to receive the pulse width modulated signal PWM, the pass input terminal b is electrically coupled to the current sense pin CS. In response to the pulse width modulated signal PWM, the pass device 401 is configured to connect the pass input terminal b to the first pass output terminal c during when the main switch 101 is on (the pulse width modulated signal PWM is at the first logic state), and to connect the pass input terminal b to the second pass output terminal d during when the main switch 101 is off (the pulse width modulated signal PWM is at the second logic state). The first pass output terminal c is configured to provide the first current sense signal Vcs1, the second pass output terminal d is configured to provide the coefficient regulation signal VK. One of ordinary skill in the art should understand that the pass device 401 in FIG. 4 is illustrative and is not intended to be limiting. The pass device 401 may comprise any circuits/elements that can be controlled by the pulsed width modulated signal PWM to transmit the signal at the current sense pin CS to the ramp compensation module 205 when the main switch 101 is on, and to transmit the signal at the current sense pin CS to the filter 306 when the main switch 101 is off.

In the compensation coefficient regulator 305 of FIG. 4, with the control of the pulse width modulated signal PWM, the controllable current source $I_C$ cuts the constant current off from the current sense pin CS when the main switch 101 is on. In meanwhile, the current sense resistor RS senses the switching current $I_H$ flowing through the main switch 101 and provides a first voltage signal indicative of the switching current $I_H$ at the current sense pin CS. At the same time, the pass device 401 connects the pass input terminal b to the first pass output terminal c to transmit the first voltage signal to the first pass output terminal c and this first voltage signal is provided to the ramp compensation module 205 as the first current sense signal Vcs1. When the main switch 101 is off, the controllable current source $I_C$ provides the constant current to the current sense pin CS, and then the constant current is converted to a second voltage signal through the coefficient regulation resistor Rk. Therefore, the second voltage signal virtually represents the percentage of the off time of the main switch 101 in a switching cycle, and thus carries the off duty cycle (1-D) information. In meanwhile, the pass device 401 connects the pass input terminal b to the second pass output terminal d during the main switch 101 is off to transmit the second voltage signal to the filter 306, i.e. the second voltage signal is provided as the coefficient regulation signal VK. As a result, the coefficient regulation signal VK in the example of FIG. 4 virtually carries the information of the duty cycle D, the constant current and the coefficient regulation resistor Rk, and is substantially proportional to the off duty cycle (1-D) and the coefficient regulation resistor Rk. In consequence, the coefficient regulation signal VK may be expressed by VK≈K*(1-D), wherein the coefficient K can be considered as the compensation coefficient. The compensation coefficient K can be modified through appropriately choosing the constant current and the coefficient regulation resistor Rk. The coefficient regulation signal VK is subsequently provided to the filter 306 and is filtered to generate the threshold compensation signal VCP. The threshold compensation signal VCP is proportional to the compensation coefficient K. In this example, the threshold compensation signal VCP varies in the reverse direction from the duty cycle D (i.e. the threshold compensation signal VCP decreases with the increase of the duty cycle D and increases with the decrease of the duty cycle D). Therefore, the threshold compensation circuit 303 is configured to subtract the threshold compensation signal VCP from the first current limit threshold Vth1 to generate the second current limit threshold Vth2 so that the second current limit threshold Vth2 varies in the same direction as the duty cycle D. In consequence, the allowable maximum value of the peak value Ipeak of the switching current $I_H$ or the inductor current $I_L$ also varies in the same direction as the duty cycle D, which means that the allowable maximum value of the output current Io increases with the increase of the duty cycle D. This may help to substantially cancel or at least remedy the decrease in the allowable maximum output power with the increase in the duty cycle D of the power converter 100 which is caused by compensating the first current limit signal Vcs1 by the ramp signal Ramp.

Figure 5:
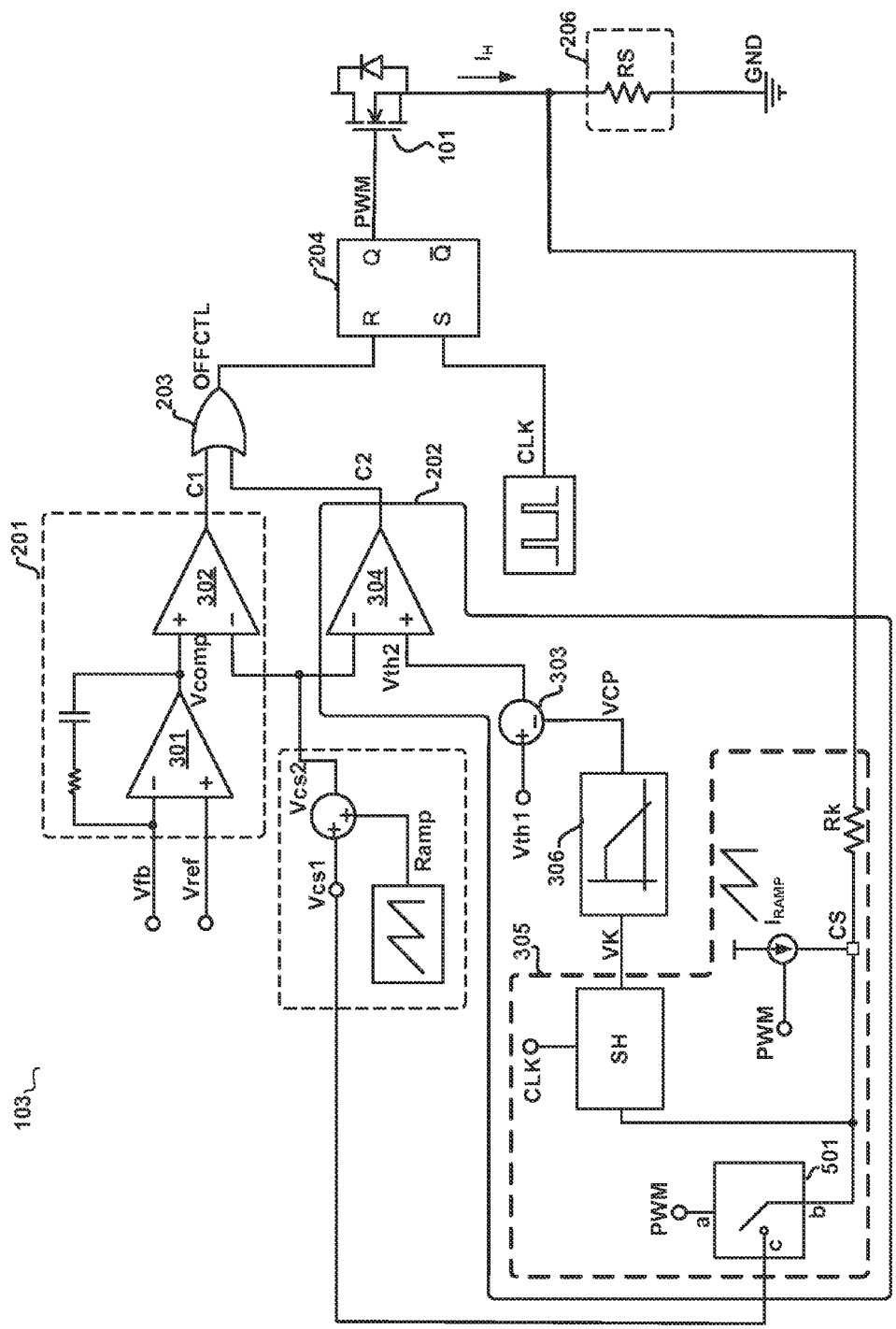
FIG. 5 illustrates an operation waveform diagram of the power converter 200 in accordance with an exemplary embodiment of the present invention.

FIG. 5 illustrates a schematic diagram of a control module 103 that can be used in the power converter 100 in accordance with an alternative embodiment of the present invention. Components or structures in the control circuit shown in FIG. 5 with substantially the same functions as those of the control circuits shown in FIG. 2, FIG. 3 and FIG. 4 are identified by the same reference labels for the sake of simplicity. The control module 103 of FIG. 5 can also be used in the power converter 100 when the current sense pin CS is used in the meanwhile as the current limit threshold regulation pin. In this example, the compensation coefficient regulator 305 may comprise a controllable current source $I_{RAMP}$, a coefficient regulation resistor Rk, a pass device 501 and a sample-hold circuit SH. The controllable current source $I_{RAMP}$ has a control terminal and an output terminal, wherein the control terminal is configured to receive the pulse width modulated signal PWM, the output terminal is electrically coupled to the current sense pin CS (i.e. the current limit threshold regulation pin in this embodiment) and is configured to output a ramp current with a predetermined slope in response to the pulse width modulated signal PWM during when the main switch 101 is off, and is configured to cut the ramp current off in response to the pulse width modulated signal PWM during when the main switch 101 is on. The coefficient regulation resistor Rk is coupled between the current limit threshold regulation pin/the current sense pin CS and the sense resistor RS. In FIG. 5, it is illustrated that a first terminal of the coefficient regulation resistor Rk is connected to the current limit threshold regulation pin CS, and a second terminal of the coefficient regulation resistor Rk is connected to a common connection of the main switch 101 and the sense resistor RS. The current sense resistor RS and the coefficient regulation resistor Rk can be provided by user and are thus user programmable. The pass device 501 has a pass control terminal a, a pass input terminal b, and a pass output terminal c, wherein the pass control terminal a is configured to receive the pulse width modulated signal PWM, the pass input terminal b is electrically coupled to current limit threshold regulation pin (i.e. the current sense pin) CS. In response to the pulse width modulated signal PWM, the pass device 501 is configured to connect the pass input terminal b to the pass output terminal c during when the main switch 101 is on (the pulse width modulated signal PWM is at the first logic state), and to disconnect the pass input terminal b from the pass output terminal c during when the main switch 101 is off (the pulse width modulated signal PWM is at the second logic state). One of ordinary skill in the art should understand that the pass device 501 in FIG. 5 is illustrative and is not intended to be limiting. The pass device 501 may comprise any circuits/elements that can be controlled by the pulsed width modulated signal PWM to transmit the signal at the current sense pin CS to the ramp compensation module 205 when the main switch 101 is on, and to cut that signal at the current sense pin CS off from the ramp compensation module 205 when the main switch 101 is off. The sample-hold circuit SH has a sample control terminal, a sample input terminal and a sample output terminal, wherein the sample control terminal is configured to receive the clock signal CLK, the sample input terminal is electrically coupled to the current limit threshold regulation pin CS, the sample-hold circuit SH is configured to sample the voltage at current limit threshold regulation pin CS at the moment when the main switch 101 is turned on in response to the clock signal CLK, and is further configured to hold the sampled voltage and provide that held sampled voltage at the sample output terminal as the coefficient regulation signal VK.

In the compensation coefficient regulator 305 of FIG. 5, during the main switch 101 is on, the controllable current source $I_{RAMP}$ does not provide the ramp current to the current sense pin CS, the sense resistor RS samples the switching current $I_H$ flowing through the main switch 101 and provides a voltage signal indicative of the switching current at the current sense pin CS. In meanwhile, the pass device 501 connects the pass input terminal b to the pass output terminal c to transmit the voltage signal at the current sense pin CS to the pass output terminal c, and this voltage signal is provided to the ramp compensation module 205 as the first current sense signal Vcs1. During the main switch 101 is off, the controllable current source $I_{RAMP}$ provides the ramp current to the current sense pin CS, and then the ramp current is converted to a ramp voltage signal through the coefficient regulation resistor Rk. Thus, during the main switch 101 is off, the voltage at the current sense pin CS is a ramp voltage ramping up with the predetermined slope of the ramp current. At the moment when the main switch 101 is switched from off to on in response to the clock signal CLK, the ramp current is cut off, the ramp voltage at the current sense pin CS stops rising. At the same time, the sample-hold circuit SH samples the voltage at the current sense pin CS of that moment. This sampled voltage actually represents the off time interval of the main switch 101, thus indicates the off duty cycle (1-D). The sample-hold circuit SH holds this sampled voltage indicative of the off duty cycle (1-D) and outputs it as the coefficient regulation signal VK. Therefore, the coefficient regulation signal VK provided by the compensation coefficient regulator 305 of FIG. 5 virtually carries the information of the off duty cycle (1-D), the slope of the ramp current and the coefficient regulation resistor Rk, and is substantially proportional to the off duty cycle (1-D) and the coefficient regulation resistor Rk. In consequence, the coefficient regulation signal VK may be expressed by VK≈K*D, wherein the coefficient K can be considered as the compensation coefficient. The compensation coefficient K can be modified through appropriately choosing the slope of the ramp current and the coefficient regulation resistor Rk. User can easily modify the compensation coefficient K by modifying the coefficient regulation resistor Rk. The coefficient regulation signal VK is subsequently provided to the filter 306 and is filtered to generate the threshold compensation signal VCP. The threshold compensation signal VCP is proportional to the compensation coefficient K. In this example, the threshold compensation signal VCP varies in the reverse direction from the duty cycle D (i.e. the threshold compensation signal VCP decreases with the increase of the duty cycle D and increases with the decrease of the duty cycle D). Therefore, the threshold compensation circuit 303 is configured to subtract the threshold compensation signal VCP from the first current limit threshold Vth1 to generate the second current limit threshold Vth2 so that the second current limit threshold Vth2 varies in the same direction as the duty cycle D. In consequence, the allowable maximum value of the peak value Ipeak of the switching current $I_H$ or the inductor current $I_L$ also varies in the same direction as the duty cycle D, which means that the allowable maximum value of the output current Io increases with the increase of the duty cycle D. This may help to substantially cancel or at least remedy the decrease in the allowable maximum output power with the increase in the duty cycle D of the power converter 100 due to compensating the first current limit signal Vcs1 by the ramp signal Ramp.

The advantages of the various embodiments of the control module 103, the current limit module 202 and the power converter (e.g. 100) comprising the same of the present invention are not confined to those described above. These and other advantages of the various embodiments of the present invention will become more apparent upon reading the whole detailed descriptions and studying the various figures of the drawings.

Figure 6:
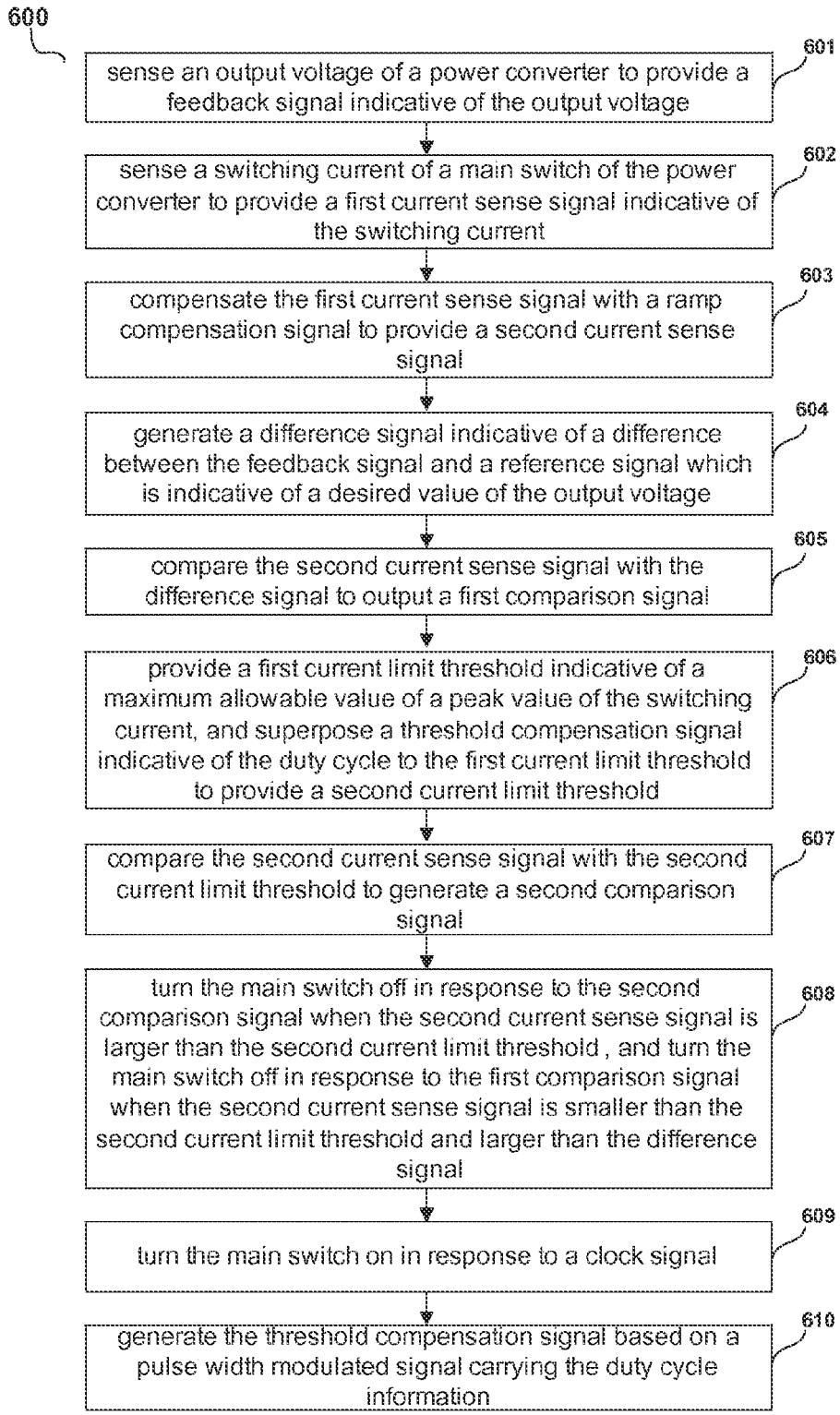
FIG. 6 illustrates a flow diagram of a method for controlling a power converter in accordance with an exemplary embodiment of the present invention.

FIG. 6 illustrates a flow diagram of a method for controlling a power converter in accordance with an exemplary embodiment of the present invention. The power converter (such as the power converter 100 described with reference to FIGS. 1-5) may at least comprise a main switch (e.g. switch 101 in FIGS. 1-5), and is configured to convert an input voltage (Vin) to an output voltage (Vo) based on driving the main switch to switch on and off, wherein a switching current (illustrated as $I_H$ in FIGS. 1-5) flows through the main switch, and wherein the percentage of the on time of the main switch in a switching cycle is referred to as a duty cycle D. The method for controlling the power converter may comprise: step 601, sensing the output voltage to provide a feedback signal indicative of the output voltage; step 602, sensing the switching current to provide a first current sense signal indicative of the switching current; step 603, compensating the first current sense signal with a ramp compensation signal to provide a second current sense signal; step 604, generating a difference signal indicative of a difference between the feedback signal and a reference signal which is indicative of a desired value of the output voltage; step 605, comparing the second current sense signal with the difference signal to output a first comparison signal; step 606, providing a first current limit threshold indicative of a maximum allowable value of a peak value of the switching current, and superposing a threshold compensation signal indicative of the duty cycle D to the first current limit threshold to provide a second current limit threshold so that the second current limit threshold increases with the increase of the duty cycle D and decreases with the decrease of the duty cycle D; step 607, comparing the second current sense signal with the second current limit threshold to generate a second comparison signal; step 608, turning the main switch off in response to the second comparison signal when the second current sense signal is larger than the second current limit threshold, and turning the main switch off in response to the first comparison signal when the second current sense signal is smaller than the second current limit threshold and larger than the difference signal; and step 609, turning the main switch on in response to a clock signal.

In accordance with an exemplary embodiment of the present invention, the step 608 may further comprise: operating the first comparison signal and the second comparison signal to generate an off trigger signal, wherein the off trigger signal comprises the first comparison signal when the second current sense signal is lower than the second current limit threshold, and wherein the off trigger signal comprises the second comparison signal when the second current sense signal is higher than the second current limit threshold; and generating a pulse width modulated signal based on the off trigger signal and the clock signal, wherein the off trigger signal triggers the pulse width modulated signal to turn the main switch off, and the clock signal triggers the pulse width modulated signal to turn the main switch on.

In accordance with an exemplary embodiment of the present invention, the method for controlling the power converter may further comprise: step 610, generating the threshold compensation signal based on the pulse width modulated signal carrying the duty cycle D information. In an embodiment, generating the threshold compensation signal may comprise: receiving the pulse width modulated signal and applying a compensation coefficient in response to the pulse width modulated signal to provide a coefficient regulation signal, wherein the coefficient regulation signal carries the information of the compensation coefficient and the duty cycle D; and filtering the coefficient regulation signal to provide the average of the coefficient regulation signal as the threshold compensation signal, wherein the threshold compensation signal is proportional to the compensation coefficient.

In accordance with an exemplary embodiment of the present invention, the threshold compensation signal increases with the increase of the duty cycle D and decreases with the decrease of the duty cycle D. Thus, at the step 606, superposing the threshold compensation signal to the first current limit threshold comprises adding the threshold compensation signal to the first current limit threshold.

In accordance with an exemplary embodiment of the present invention, the threshold compensation signal decreases with the increase of the duty cycle D and increases with the decrease of the duty cycle D. Thus, at the step 606, superposing the threshold compensation signal to the first current limit threshold comprises subtracting the threshold compensation signal from the first current limit threshold.

In accordance with an exemplary embodiment of the present invention, the power converter has an independent current limit threshold regulation pin. At the step 610, providing the coefficient regulation signal may comprise: coupling a coefficient regulation resistor between the current limit threshold regulation pin and the reference ground; providing a constant current to the current limit threshold regulation pin when the main switch is on, and cutting the constant current off from the current limit threshold regulation pin when the main switch is off in response to the pulse width modulated signal; and providing the coefficient regulation signal at the current limit threshold regulation pin. In this example, the threshold compensation signal generated at the step 610 increases with the increase of the duty cycle D and decreases with the decrease of the duty cycle D.

In accordance with an exemplary embodiment of the present invention, the power converter has an independent current limit threshold regulation pin. At the step 610, providing the coefficient regulation signal may comprise: coupling a coefficient regulation resistor between the current limit threshold regulation pin and the reference ground; providing a ramp current with a predetermined slope to the current limit threshold regulation pin when the main switch is on, and cutting the ramp current off from the current limit threshold regulation pin when the main switch is off in response to the pulse width modulated signal; and sampling the voltage at the current limit threshold regulation pin at the moment when the main switch is turned off, holding the sampled voltage and providing the held sampled voltage as the coefficient regulation signal. In this example, the threshold compensation signal generated at the step 610 increases with the increase of the duty cycle D and decreases with the decrease of the duty cycle D.

In accordance with an exemplary embodiment of the present invention, the power converter has a current sense pin coupled to the reference ground through a sense resistor, wherein the current sense pin is used as a current limit threshold regulation pin in meanwhile. At the step 610, providing the coefficient regulation signal may comprise: coupling a coefficient regulation resistor between the current sense pin and the sense resistor; providing a constant current to the current sense pin when the main switch is off, and cutting the constant current off from the current sense pin when the main switch is on in response to the pulse width modulated signal; and with the control of the pulse width modulated signal, providing the voltage at the current sense pin as the first current sense signal during the main switch is on, and providing the voltage at the current sense pin as the coefficient regulation signal during the main switch is off. In this example, the threshold compensation signal generated at the step 610 decreases with the increase of the duty cycle D and increases with the decrease of the duty cycle D.

In accordance with an exemplary embodiment of the present invention, the power converter has a current sense pin coupled to the reference ground through a sense resistor, wherein the current sense pin is used as a current limit threshold regulation pin in meanwhile. At the step 610, providing the coefficient regulation signal may comprise: coupling a coefficient regulation resistor between the current sense pin and the sense resistor; providing a ramp current with a predetermined slope to the current sense pin when the main switch is off, and cutting the ramp current off from the current sense pin when the main switch is on in response to the pulse width modulated signal; and sampling the voltage at the current sense pin at the moment when the main switch is turned off, holding the sampled voltage and providing the held sampled voltage as the coefficient regulation signal. In this example, the threshold compensation signal generated at the step 610 increases with the increase of the duty cycle D and decreases with the decrease of the duty cycle D.

Methods and steps of controlling the power converter described above in the various embodiments of the present invention are illustrative and not intended to be limiting. Well known controlling steps, operating processes, and parameters etc. are not described in detail to avoid obscuring aspects of the invention. Those skilled in the art should understand that the steps described in the embodiments with reference to FIG. 6 may be implemented in different orders and are not limited to the embodiments described.

Although a control module, a current limit module, a power converter comprising the same and associated control methods are illustrated and explained based on a fly-back type power converter according to various embodiments of the present invention, this is not intended to be limiting. Persons of ordinary skill in the art will understand that the circuits, methods and principles taught herein may apply to any other suitable types of power converters, such as boost type power converter, buck-boost type power converter or flyback type power converter etc.

From the foregoing, it will be appreciated that specific embodiments of the present invention have been described herein for purposes of illustration, but that various modifications may be made without deviating from the spirit and scope of various embodiments of the present invention. Many of the elements of one embodiment may be combined with other embodiments in addition to or in lieu of the elements of the other embodiments. Accordingly, the present invention is not limited except as by the appended claims.

I claim:

1. A current limit module for a power converter, wherein the power converter comprises a main switch and is configured to convert an input voltage to an output voltage based on driving the main switch to switch on and off in response to a pulse width modulated signal, and wherein a switching current flows through the main switch, and wherein the percentage of the on time of the main switch in a switching cycle is referred to as a duty cycle, the current limit module comprising:
  a threshold compensation circuit having a first compensation input terminal, a second compensation input terminal and a compensation output terminal, wherein the first compensation input terminal is configured to receive a first current limit threshold indicative of a maximum allowable value of a peak value of the switching current, and wherein the second compensation input terminal is configured to receive a threshold compensation signal indicative of the duty cycle, and wherein the threshold compensation circuit is configured to superpose the threshold compensation signal with the first current limit threshold to provide a second current limit threshold at the compensation output terminal; and
  a current limit comparison circuit having a first comparison input terminal, a second comparison input terminal and a comparison output terminal, wherein the first comparison input terminal is configured to receive a second current sense signal indicative of the switching current with ramp compensation, and wherein the second comparison input terminal is configured to receive the second current limit threshold, and wherein the current limit comparison circuit is configured to compare the second current sense signal with the second current limit threshold to generate a second comparison signal at the comparison output terminal, and wherein the second comparison signal triggers the pulse width modulated signal to turn the main switch off when the second current sense signal exceeds the second current limit threshold.

2. The current limit module of claim 1, wherein the threshold compensation signal increases with the increase of the duty cycle and decreases with the decrease of the duty cycle, and wherein the threshold compensation circuit is configured to superpose the threshold compensation signal with the first current limit threshold by adding the threshold compensation signal to the first current limit threshold.

3. The current limit module of claim 1, wherein the threshold compensation signal decreases with the increase of the duty cycle and increases with the decrease of the duty cycle, and wherein the threshold compensation circuit is configured to superpose the threshold compensation signal with the first current limit threshold by subtracting the threshold compensation signal from the first current limit threshold.

4. The current limit module of claim 1 further comprising:
  a ramp compensation module, configured to receive a first current sense signal generated by sensing the switching current and a ramp compensation signal having a predetermined slope, and further configured to add the first current sense signal with the ramp compensation signal to provide the second current sense signal.

5. The current limit module of claim 1 further comprising:
  a compensation signal generator configured to generate the threshold compensation signal, wherein the compensation signal generator comprises:
    a compensation coefficient regulator configured to receive the pulse width modulated signal which carries the duty cycle information, and further configured to apply a compensation coefficient in response to the pulse width modulated signal to provide a coefficient regulation signal, wherein the coefficient regulation signal carries the information of the compensation coefficient and the duty cycle; and
    a filter configured to receive the coefficient regulation signal, and further configured to filter the coefficient regulation signal to provide the average of the coefficient regulation signal as the threshold compensation signal.

6. The current limit module of claim 5, wherein the power converter has an independent current limit threshold regulation pin; and wherein the threshold compensation circuit is configured to add the threshold compensation signal to the first current limit threshold; and wherein the compensation coefficient regulator comprises:
   a controllable current source having a control terminal and an output terminal, wherein the control terminal is configured to receive the pulse width modulated signal, the output terminal is electrically coupled to the current limit threshold regulation pin and is configured to output a substantially constant current in response to the pulse width modulated signal during the main switch is on, and is further configured to cut the constant current off in response to the pulse width modulated signal during the main switch is off; and
   a coefficient regulation resistor coupled between the current limit threshold regulation pin and a reference ground, wherein the coefficient regulation resistor is user programmable, and wherein the coefficient regulation signal is provided at the current limit threshold regulation pin.

7. The current limit module of claim 5, wherein the power converter has an independent current limit threshold regulation pin; and wherein the pulse width modulated signal is triggered to turn the main switch on with a clock signal and is triggered to turn the main switch off with an off trigger signal; and wherein the threshold compensation circuit is configured to add the threshold compensation signal to the first current limit threshold; and wherein the compensation coefficient regulator comprises:
   a controllable current source having a control terminal and an output terminal, wherein the control terminal is configured to receive the pulse width modulated signal, the output terminal is electrically coupled to the current limit threshold regulation pin and is configured to output a ramp current with a predetermined slope in response to the pulse width modulated signal during the main switch is on, and is further configured to cut the ramp current off in response to the pulse width modulated signal during the main switch is off;
   a coefficient regulation resistor coupled between the current limit threshold regulation pin and a reference ground, wherein the coefficient regulation resistor is user programmable; and
   a sample-hold circuit having a sample control terminal, a sample input terminal and a sample output terminal, wherein the sample control terminal is configured to receive the off trigger signal, and wherein the sample input terminal is electrically coupled to the current limit threshold regulation pin, and wherein the sample-hold circuit is configured to sample a voltage at the current limit threshold regulation pin at the moment when the main switch is turned off in response to the off trigger signal, and is further configured to hold the sampled voltage and provide that held sampled voltage at the sample output terminal as the coefficient regulation signal.

8. The current limit module of claim 5, wherein the power converter has a current sense pin coupled to a reference ground through a sense resistor, the current sense pin is used in meanwhile as a current limit threshold regulation pin; and wherein the threshold compensation circuit is configured to subtract the threshold compensation signal from the first current limit threshold; and wherein the compensation coefficient regulator comprises:
   a controllable current source having a control terminal and an output terminal, wherein the control terminal is configured to receive the pulse width modulated signal, the output terminal is electrically coupled to the current sense pin and is configured to output a substantially constant current in response to the pulse width modulated signal during the main switch is off, and is further configured to cut the constant current off in response to the pulse width modulated signal during the main switch is on;
   a coefficient regulation resistor coupled between the current sense pin and the sense resistor, wherein the coefficient regulation resistor is user programmable; and
   a pass device having a pass control terminal, a pass input terminal, a first pass output terminal and a second pass output terminal, wherein the pass control terminal is configured to receive the pulse width modulated signal, and wherein the pass input terminal is electrically coupled to the current sense pin; and wherein the pass device is configured to connect the pass input terminal to the first pass output terminal during the main switch is on, and to connect the pass input terminal to the second pass output terminal during the main switch is off; and wherein the second pass output terminal is configured to provide the coefficient regulation signal.

9. The current limit module of claim 5, wherein the power converter has a current sense pin coupled to a reference ground through a sense resistor, the current sense pin is used in meanwhile as a current limit threshold regulation pin; and wherein the pulse width modulated signal is triggered to turn the main switch on with a clock signal and is triggered to turn the main switch off with an off trigger signal; and wherein the threshold compensation circuit is configured to subtract the threshold compensation signal from the first current limit threshold; and wherein the compensation coefficient regulator comprises:
   a controllable current source having a control terminal and an output terminal, wherein the control terminal is configured to receive the pulse width modulated signal, the output terminal is electrically coupled to the current sense pin and is configured to output a ramp current with a predetermined slope in response to the pulse width modulated signal PWM during the main switch is off, and is further configured to cut the ramp current off in response to the pulse width modulated signal during when the main switch is on;
   a coefficient regulation resistor coupled between the current sense pin and the sense resistor, wherein the coefficient regulation resistor is user programmable;
   a pass device has a pass control terminal, a pass input terminal, and a pass output terminal, wherein the pass control terminal is configured to receive the pulse width modulated signal, and wherein the pass input terminal is electrically coupled to the current sense pin; and wherein the pass device is configured to connect the pass input terminal to the pass output terminal during the main switch is on, and to disconnect the pass input terminal from the pass output terminal during the main switch is off; and
   a sample-hold circuit having a sample control terminal, a sample input terminal and a sample output terminal, wherein the sample control terminal is configured to receive the clock signal, and wherein the sample input terminal is electrically coupled to the current sense pin;

and wherein the sample-hold circuit is configured to sample a voltage at the current sense pin at the moment when the main switch is turned on in response to the clock signal, and is further configured to hold the sampled voltage and provide that held sampled voltage at the sample output terminal as the coefficient regulation signal.

10. A control module comprising the current limit module of claim 1, and further comprising:
a current sense module electrically coupled to the main switch to sense the switching current and to provide a first current sense signal indicative of the switching current;
a ramp compensation module configured to receive the first current sense signal and a ramp compensation signal having a predetermined slope, and further configured to add the first current sense signal with the ramp compensation signal to provide the second current sense signal;
a pulse width modulation module configured to receive a feedback signal indicative of the output voltage, a reference signal indicative of a desired value of the output voltage and the second current sense signal, and further configured to provide a difference signal indicative of a difference between the feedback signal and the reference signal, and further configured to compare the second current sense signal with the difference signal to provide a first comparison signal;
a logic operational module configured to receive the first comparison signal and the second comparison signal respectively, and further configured to provide an off trigger signal based on operating the first comparison signal and the second comparison signal, wherein the off trigger signal comprises the first comparison signal when the second current sense signal is lower than the second current limit threshold, and wherein the off trigger signal comprises the second comparison signal when the second current sense signal is higher than the second current limit threshold; and
a logic control module configured to receive the off trigger signal and a clock signal respectively, and further configured to provide the pulse width modulated signal based on the off trigger signal and the clock signal, wherein the clock signal triggers the logic control module to set the pulse width modulated signal at a first logic state, and wherein the off trigger signal triggers the logic control module to set the pulse width modulated signal at a second logic state; and wherein the pulse width modulated signal is configured to turn the main on at the first logic state and to turn the main switch off at the second logic state.

11. A power converter comprising:
an input port configured to receive an input voltage;
an output port configured to provide an output voltage;
a switching module comprising at least a main switch configured to conduct on and off switching in response to a pulse width modulated signal so as to convert the input voltage into the output voltage, wherein a switching current flows through the main switch, and wherein the percentage of the on time of the main switch in a switching cycle is referred to as a duty cycle; and
a control module having a first input terminal configured to receive a feedback signal indicative of the output voltage, a second input terminal configured to receive a reference signal indicative of a desired value of the output voltage, a third input terminal configured to receive a first current sense signal indicative of the switching current, a fourth input terminal configured to receive a first current limit threshold indicative of a maximum allowable value of a peak value of the switching current, and a control output terminal configured to provide the pulse width modulated signal, wherein the control module is configured to compensate the first current sense signal with a ramp compensation signal to generate a second current sense signal, and is further configured to superpose a threshold compensation signal indicative of the duty cycle with the first current limit threshold to provide a second current limit threshold, and is further configured to compare the second current sense signal with the second current limit threshold to provide a second comparison signal, and wherein the second comparison signal triggers the pulse width modulated signal to turn the main switch off when the second current sense signal exceeds the second current limit threshold.

12. The power converter of claim 11, wherein the second current limit threshold increases with the increase of the duty cycle and decreases with the decrease of the duty cycle.

13. The power converter of claim 11, wherein the control module comprises a current limit module, and wherein the current limit module comprises:
a threshold compensation circuit having a first compensation input terminal, a second compensation input terminal and a compensation output terminal, wherein the first compensation input terminal is configured to receive the first current limit threshold, the second compensation input terminal is configured to receive the threshold compensation signal; and wherein the threshold compensation circuit is configured to superpose the threshold compensation signal with the first current limit threshold to provide a second current limit threshold at the compensation output terminal; and
a current limit comparison circuit having a first comparison input terminal, a second comparison input terminal and a comparison output terminal, wherein the first comparison input terminal is configured to receive the second current sense signal, and wherein the second comparison input terminal is configured to receive the second current limit threshold, and wherein the current limit comparison circuit is configured to compare the second current sense signal with the second current limit threshold to generate a second comparison signal at the comparison output terminal, and wherein the second comparison signal triggers the pulse width modulated signal to turn the main switch off when the second current sense signal exceeds the second current limit threshold.

14. The power converter of claim 13, wherein the current limit module further comprises:
a compensation signal generator configured to generate the threshold compensation signal, wherein the compensation signal generator comprises:
a compensation coefficient regulator configured to receive the pulse width modulated signal which carries the duty cycle information, and further configured to apply a compensation coefficient in response to the pulse width modulated signal to provide a coefficient regulation signal, wherein the coefficient regulation signal carries the information of the compensation coefficient and the duty cycle; and
a filter configured to receive the coefficient regulation signal, and further configured to filter the coefficient regulation signal to provide the average of the coefficient regulation signal as the threshold compensation signal.

15. The power converter of claim 11, wherein the control module comprises:
  a ramp compensation module, configured to receive the first current sense signal and the ramp compensation signal, and further configured to add the first current sense signal with the ramp compensation signal to provide the second current sense signal.

16. The power converter of claim 11, wherein the control module further comprises;
  a pulse width modulation module configured to receive the feedback signal, the reference signal and the second current sense signal respectively, and further configured to provide a difference signal indicative of a difference between the feedback signal and the reference signal, and further configured to compare the second current sense signal with the difference signal to provide a first comparison signal;
  a logic operational module configured to receive the first comparison signal and the second comparison signal respectively, and further configured to provide an off trigger signal based on operating the first comparison signal and the second comparison signal, wherein the off trigger signal comprises the first comparison signal when the second current sense signal is lower than the second current limit threshold, and wherein the off trigger signal comprises the second comparison signal when the second current sense signal is higher than the second current limit threshold; and
  a logic control module configured to receive the off trigger signal and a clock signal respectively, and further configured to provide the pulse width modulated signal based on the off trigger signal and the clock signal, wherein the clock signal triggers the logic control module to set the pulse width modulated signal at a first logic state, and wherein the off trigger signal triggers the logic control module to set the pulse width modulated signal at a second logic state; and wherein the pulse width modulated signal is configured to turn the main on at the first logic state and to turn the main switch off at the second logic state.

17. A method for controlling a power converter, wherein the power converter comprises a main switch and is configured to convert an input voltage to an output voltage based on driving the main switch to switch on and off, and wherein a switching current flows through the main switch, and wherein the percentage of the on time of the main switch in a switching cycle is referred to as a duty cycle, the method comprising:
  sensing the output voltage to provide a feedback signal indicative of the output voltage;
  sensing the switching current to provide a first current sense signal indicative of the switching current;
  compensating the first current sense signal with a ramp compensation signal to provide a second current sense signal;
  generating a difference signal indicative of a difference between the feedback signal and a reference signal, wherein the reference signal is indicative of a desired value of the output voltage;
  comparing the second current sense signal with the difference signal to output a first comparison signal;
  providing a first current limit threshold indicative of a maximum allowable value of a peak value of the switching current, and superposing a threshold compensation signal indicative of the duty cycle to the first current limit threshold to provide a second current limit threshold;
  comparing the second current sense signal with the second current limit threshold to generate a second comparison signal;
  turning the main switch off in response to the second comparison signal when the second current sense signal is larger than the second current limit threshold, and turning the main switch off in response to the first comparison signal when the second current sense signal is smaller than the second current limit threshold and larger than the difference signal; and
  turning the main switch on in response to a clock signal.

18. The method of claim 17, further comprising:
  operating the first comparison signal and the second comparison signal to generate an off trigger signal, wherein the off trigger signal comprises the first comparison signal when the second current sense signal is lower than the second current limit threshold, and wherein the off trigger signal comprises the second comparison signal when the second current sense signal is higher than the second current limit threshold; and
  generating a pulse width modulated signal based on the off trigger signal and the clock signal, wherein the off trigger signal triggers the pulse width modulated signal to turn the main switch off, and the clock signal triggers the pulse width modulated signal to turn the main switch on.

19. The method of claim 17 further comprising generating the threshold compensation signal based on a pulse width modulated signal carrying the duty cycle information, wherein generating the threshold compensation signal comprises:
  receiving the pulse width modulated signal and applying a compensation coefficient in response to the pulse width modulated signal to provide a coefficient regulation signal, wherein the coefficient regulation signal carries the information of the compensation coefficient and the duty cycle; and
  filtering the coefficient regulation signal to provide the average of the coefficient regulation signal as the threshold compensation signal, wherein the threshold compensation signal is proportional to the compensation coefficient.

20. The method of claim 17, wherein
if the threshold compensation signal increases with the increase of the duty cycle and decreases with the decrease of the duty cycle, superposing the threshold compensation signal to the first current limit threshold comprises subtracting the threshold compensation signal from the first current limit threshold; and wherein
if the threshold compensation signal decreases with the increase of the duty cycle and increases with the decrease of the duty cycle, superposing the threshold compensation signal to the first current limit threshold comprises subtracting the threshold compensation signal from the first current limit threshold.

* * * * *